Patented Aug. 7, 1934

1,969,686

UNITED STATES PATENT OFFICE 1,969,686

PREPARATION OF HEXACHLOROPHENOL

Edgar C. Britton, Lawrence F. Martin, Francis Nelson Alquist, and Roy Lyman Heindel, Jr., Midland, Mich., assignors to The Dow Chemical Company, Midland, Mich., a corporation of Michigan No Drawing. Application April 12, 1932, Serial No. 604,864

11 Claims. (Cl. 260—56)

The invention relates to methods for the preparation of hexachlorophenol; particularly to a method wherein the formation of hexachlorophenol is accomplished by the direct chlorination of phenol.

Hexachlorophenol is a compound having the following structural formula:—

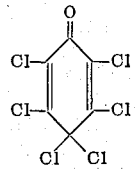

The preparation of this compound from phenol and chlorine comprises a step reaction involving the successive formation of mono-, di-, tri-, tetra-, penta-, and hexachlorophenol. The formation of any of these compounds up to and including the tetrachlorophenol stage may be accomplished by well known methods of chlorination in a ready manner, but certain difficulties are encountered in chlorinating from the tetrachloro- to the hexachloro- stage. Among these difficulties, which inure to methods heretofore known for the preparation of hexachlorophenol by chlorinating phenol, are:—the loss of the chlorinating catalyst; the extended period of time required for the reaction to go to completion; and, the danger of over-chlorinating the hexachlorophenol subsequent to its formation.

The chlorination of phenol past the trichloro- stage should be carried out in the presence of a chlorinating catalyst, e. g., antimony pentachloride, ferric chloride, etc. The loss of the chlorinating catalyst in known methods for the preparation of hexachlorophenol from phenol and chlorine is occasioned by the fact that it is more economical to use a new quantity of catalyst than to recover the used catalyst from the hexachloro- product. The period of time required for the reaction to go to completion is considerable because it is impossible to conduct the chlorination of pentachlorophenol, the intermediate product between tetra- and hexachlorophenol, in molten condition. This is due to the elevated melting point of the pentachloro- compound, i. e. 190° C., in relation to either tetrachlorophenol (70° C.) or hexachlorophenol (107° C.). If the temperature is maintained sufficiently high to keep the pentachloro- compound in the liquid phase, the hexacholorophenol will decompose as rapidly as it is formed. Therefore, in methods heretofore disclosed it has been customary to chlorinate pentachlorophenol in the solid phase, a procedure which takes an excessively long time. The danger in previously known methods of over-chlorinating the hexachlorophenol subsequent to its formation has required delicate control of the reaction. If more than the theoretical quantity of chlorine, based on the amount calculated as necessary to convert the pentachlorophenol therein to hexachlorophenol, is added to the reaction mixture, the hexachloro- compound will at once begin to be converted to higher chlorinated compounds, e. g. octachlorophenol.

We have found that the aforestated difficulties can be avoided by carrying out the chlorination of phenol in the presence of a suitable solvent, or at least employing such solvent in the stage of chlorination from tetrachlorophenol to hexachlorophenol, thus causing the pentachlorophenol to be formed in a solvent medium, wherein it will remain in the liquid phase and may readily be chlorinated to hexachlorophenol. We have also made the unexpected discovery that the chlorination of pentachlorophenol to hexachlorophenol can be conducted in a solvent without any over-chlorination resulting, even though chlorine is passed therethrough in excess of the amount theoretically required for the conversion to the hexachlorophenol. Further, we have found that the solvent may be recycled, after crystallization of the hexachlorophenol therefrom, while still retaining the chlorination catalyst in solution, and that the catalyst can thus be preserved in an active state for further use, which results in a substantial economy.

Accordingly, it is among the objects of the invention to set forth a method whereby hexachlorophenol can advantageously be prepared from phenol by exhaustively chlorinating the same in the presence of a solvent.

To the accomplishment of the foregoing and related ends, the invention, then, consists of the steps hereinafter fully described and particularly pointed out in the claims, the following description setting forth in detail several modes of carrying out the invention, such disclosed modes illustrating however, but several of various ways in which the principle of the invention may be realized.

Our method for the preparation of hexachlorophenol will best be understood by a brief description of the conditions under which the chlorination of phenol takes place. A quantity of phenol is placed in a suitable reactor and heated to a temperature between 60° and 110° C., preferably between 70° and 80° C. Dry chlorine is bubbled through the molten phenol until rapid reaction therebetween ceases, i. e. until approximately the trichlorophenol stage is reached. Thereupon a chlorinating catalyst, such as antimony pentachloride, in the amount of between about 3 and 5 per cent by weight of the original amount of phenol, is advantageously added to the mixture in order to speed up the reaction and the passage of chlorine therethrough continued. The reaction then progresses rapidly through the tetrachlorophenol stage. Then a quantity of a solvent, such as ethylene chloride, is introduced into the reactor in the amount by weight of about 2.5 to 5 times the original amount of phenol used, depending upon the solubility of pentachlorophenol in the particular solvent chosen. The passage of chlorine through the reaction mixture is then continued until the conversion to hexachlorophenol is complete, although it may be run through for some time thereafter without over-chlorination resulting.

Although we have described the addition of the chlorinating catalyst to the reaction mixture after the trichloro- stage is reached therein, and the addition of the solvent after completion of the tetrachloro- stage, we are not limited to this procedure. For instance, a simple mode of procedure which may advantageously be followed in large-scale operation is to introduce a quantity of phenol, together with the catalyst and the solvent, into a reactor and conduct the entire chlorination in the presence of the catalyst and solvent as one step.

In any case, when the hexachlorophenol stage in the chlorination is reached, the reaction mixture is distilled to evaporate off about 50 to 70 per cent of the solvent, which is recovered for reuse, and thereby between 70 and 95 per cent of the hexachlorophenol formed may be crystallized out, and the crystals separated from the mother liquor. The mother liquor, consisting of the remainder of the solvent, the catalyst, and about 5 to 30 per cent of a residue of uncrystallized hexachlorophenol and some unchlorinated pentachlorophenol, may be reused in a succeeding reaction.

We have found that the aforementioned reaction steps are preferably to be conducted in the absence of metallic iron after the tetrachlorophenol stage is reached, since in the presence thereof, decomposition products may be formed and extremely low yields of the products desired are obtained.

We will now describe a specific example which is representative of results obtained in carrying out our improved process.

*Example 1*

A charge of 150 pounds of partially chlorinated phenol containing 57 per cent by weight of combined chlorine, consisting of a mixture of trichlorophenol and tetrachlorophenol in the ratio of 0.417 mols. of trichloro- to 0.308 mols. of tetrachlorophenol, equivalent to 68.2 pounds or 0.725 mols of phenol was put in an enamel-lined reactor of 55 gallon capacity, equipped with a mechanical agitator and reflux condenser. 3.5 pounds of antimony pentachloride, or 5 per cent of the weight of the phenol used, was introduced as a catalyst. As a solvent, 301 pounds of ethylene chloride was added to the charge in the reactor. The reaction mixture was then warmed to 70° C., chlorine passed in, and the hydrogen chloride evolved was continuously removed through a gas vent. The passage of chlorine through the reaction mixture was continued for two hours after the evolution of hydrogen chloride had ceased, in other words, after about complete chlorination of the phenol to hexachlorophenol. The reaction mixture was then distilled to evaporate off 233 pounds or 74 per cent of ethylene chloride, and upon cooling 195 pounds of substantially pure hexachlorophenol crystals were precipitated and separated from the mother liquor. This was a yield of 89.4 per cent of the theoretical amount obtainable from the weight of phenol used.

The results obtainable by reusing the mother liquor containing the catalyst after the separation of the hexachlorophenol crystals therefrom will be shown in the following specific example.

*Example 2*

282 grams (3 mols.) of phenol, was dissolved in 800 grams of ethylene chloride, exhaustively chlorinated in the presence of 14.1 grams of antimony pentachloride at a temperature between 70° and 75° C., and the exit gases, scrubbed free of hydrogen chloride, passed into phenol in an auxiliary reactor whereby the chlorine in the gases was recovered and the phenol partially chlorinated. The reaction product was distilled and 412 grams of ethylene chloride recovered. The solution was then cooled to precipitate hexachlorophenol crystals and a yield of 620 grams or 68.6 per cent of hexachlorophenol was obtained by filtering the crystals from the mother liquor. The equivalent of 282 grams of phenol in a partially chlorinated state from the auxiliary reactor was then dissolved in the mother liquor and chlorinated to about the tetrachlorophenol stage, at which point 490 grams of ethylene chloride was added so that the total amount of ethylene chloride in the reaction mixture was again about 800 grams, and the phenol exhaustively chlorinated. The steps of distilling off a portion of the solvent, precipitating the crystals, etc., were repeated and a yield of 860 grams or 95.2 per cent of hexachlorophenol obtained. A third run conducted substantially in the same manner produced a yield of 803 grams or 89 per cent of hexachlorophenol. The improved yields of hexachlorophenol obtained from the second and third runs are secured because the solvent is partially saturated with hexachlorophenol from the mother liquor which is being recycled. The foregoing example shows clearly that the mother liquor containing the catalyst may be reused with advantageous results and that the activity of the catalyst is substantially unimpaired.

As specific examples of the use of solvents other than ethylene chloride, we will describe the results obtained from runs conducted in propylene chloride and carbon tetrachloride.

*Example 3*

282 grams or 3 mols. of phenol, in solution in 800 grams of propylene chloride, was chlorinated in the presence of 14.1 grams or 5 per cent of antimony pentachloride at a temperature between 68° and 78° C. A yield of 526 grams, or 58.3 per cent, of hexachlorophenol was obtained by one crystallization, leaving a considerable amount of hexachlorophenol which could have been recovered by further crystallization still in the mother liquor.

*Example 4*

We chlorinated 282 grams of phenol in solution in 1600 grams of carbon tetrachloride in the presence of 14.1 grams of antimony pentachloride at a temperature of about 70° C. The yield of hexachlorophenol crystals obtained directly was 680 grams or 75.3 per cent.

As examples of the use of other chlorinating catalysts, the following results were obtained from runs conducted in ethylene chloride as a solvent using tellurium chloride and ferric chloride as catalysts.

Example 5

282 grams or 3 mols. of phenol in solution in 800 grams of ethylene chloride was exhaustively chlorinated in the presence of 14.1 grams, or 5 per cent of the weight of the phenol, of tellurium tetrachloride as a catalyst, at a temperature of 78° to 84° C. Upon concentration of the reaction mixture by evaporating about 400 grams of the ethylene chloride therefrom, and cooling, 708 grams of practically pure hexachlorophenol, or a yield of 78.5 per cent was obtained.

Example 6

Another run was conducted under conditions substantially as set forth in the previous run but using 14.1 grams of ferric chloride as a chlorinating catalyst. The yield of hexachlorophenol obtained was 640 grams or 71.6 per cent.

As an alternative procedure for working up the reaction product a technical grade of hexachlorophenol can be obtained by adding water directly to the reaction product to precipitate the catalyst, filtering the precipitate out, and evaporating the mixture substantially to dryness, preferably under reduced pressure, the evaporated solvent being recovered for reuse in the process.

In order to decrease the time required for the chlorination, we have found it desirable to pass the chlorine into a phenol and solvent mixture in a reactor at a rate somewhat in excess of the rate at which it will be absorbed by the phenol, particularly in the latter stages of the chlorination. In large scale practice this procedure would result in the loss of a substantial amount of chlorine and vapors of the solvent. Therefore, we advantageously pass the exit gases containing such excess chlorine and vapors of solvent into an auxiliary reactor having therein a fresh charge of phenol, either with or without a quantity of solvent, maintained in a liquid condition whereby such chlorine and vapors are absorbed and thus recovered. The phenol in the absorbing solution is partially chlorinated, and may then be used as starting material in the preparation of a further quantity of hexachlorophenol.

Other chlorinating catalysts may be substituted for those disclosed in specific examples, e. g. iodine, molybdenum chlorides, sulphur chloride, etc. The solvents which may be used in carrying out the chlorination are materials which will themselves not chlorinate under the conditions of temperature hereinbefore set forth as used in effecting the process and which will dissolve pentachlorophenol. Among such materials are: (1) hydrocarbon oil fractions, free from unsaturated compounds, having a boiling point range between 60° and 150° C.; (2) liquid monochloro paraffin hydrocarbons having a boiling point above 60° C., such as n-butyl chloride, iso-butyl chloride; (3) liquid dichloro paraffin hydrocarbons having a boiling point above 60° C., such as ethylene chloride, propylene chloride, butylene chloride, amylene chloride; (4) liquid chlorinated olefinic hydrocarbons having a boiling point above 60° C., such as hexachloropropylene; and (5) liquid polychloro paraffin hydrocarbons having a boiling point above 60° C., such as carbon tetrachloride, tetrachloroethane, trichloroethane, trichloromethane; employed either singly or in admixture.

The advantages hereinafter enumerated inhere to our novel method for the preparation of hexachlorophenol from phenol and chlorine. The problem of chlorinating pentachlorophenol in the solid phase is circumvented by causing the pentachlorophenol to be formed in a solvent medium wherein it will remain in the liquid phase and may readily be chlorinated. The possibility of overchlorinating the hexachlorophenol subsequent to the formation thereof is prevented by the use of a solvent. The recovery of the catalyst in an economical manner is made possible. Our preferable temperature range for conducting the reaction is well below that disclosed in known methods which results in the dual advantage of requiring less heat energy and of preventing decomposition products being formed during the reaction.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. In a method of preparing hexachlorophenol, the step which consists in exhaustively chlorinating phenol at a temperature above about 60° C. in the liquid phase in a solvent consisting of a liquid chlorinated hydrocarbon of the paraffin series having a boiling point above 60° C., in the presence of a chlorinating catalyst.

2. In a method of preparing hexachlorophenol, the step which consists in exhaustively chlorinating phenol at a temperature between 60° and 110° C. in a liquid chlorinated hydrocarbon of the paraffin series having a boiling point above 60° C. in the presence of a chlorinating catalyst.

3. In a method of preparing hexachlorophenol, the step which consists in exhaustively chlorinating phenol at a temperature between 60° and 110° C. in a liquid chlorinated hydrocarbon of the paraffin series having a boiling point above 60° C. in the presence of a chlorinating catalyst in the amount of between about 3 and 5 per cent by weight of the phenol.

4. In a method of preparing hexachlorophenol, the step which consists in exhaustively chlorinating phenol at a temperature between 60° and 110° C. in a liquid chlorinated hydrocarbon of the paraffin series having a boiling point above 60° C., in the amount of about 2.5 to 5 times by weight the amount of phenol in the presence of a chlorinating catalyst in the amount of between about 3 and 5 per cent by weight of the phenol.

5. In a method of preparing hexachlorophenol, the step which consists in exhaustively chlorinating phenol in an ethylene chloride solution at a temperature between 70° and 80° C. in the presence of a chlorinating catalyst.

6. In a method of preparing hexachlorophenol, the step which consists in exhaustively chlorinating phenol in an ethylene chloride solution at a temperature between 70° and 80° C. in the presence of antimony pentachloride.

7. In a method of preparing hexachlorophenol, the step which consists in exhaustively chlorinating phenol in an ethylene chloride solution at a temperature between 70° and 80° C. in the presence of antimony pentachloride in the amount of about 5 per cent by weight of the amount of phenol.

8. In a method of preparing hexachlorophenol, the step which consists in exhaustively chlorinating phenol in ethylene chloride in the amount of about 4.5 times by weight the amount of phenol at a temperature between 70° and 80° C. in the presence of antimony pentachloride in the amount of about 5 per cent by weight of the amount of phenol.

9. In a method of preparing hexachlorophenol, the steps which consist in intermixing chlorine with phenol at a temperature between 70° and 80° C. in an ethylene chloride solution in the presence of antimony pentachloride in the amount of about 5 per cent by weight of the amount of phenol, evaporating ethylene chloride from the reaction mixture to crystallize hexachlorophenol therefrom and separating the crystals from the mother liquor.

10. In a method of preparing hexachlorophenol, the steps which consist in intermixing chlorine with phenol at a temperature between 70° and 80° C. in an ethylene chloride solution in the presence of antimony pentachloride in the amount of 5 per cent by weight of the amount of phenol, evaporating a portion of the ethylene chloride from the reaction mixture, crystallizing hexachlorophenol from the residual solution, separating the crystals from the mother liquor, and returning the mother liquor to the first step.

11. In a method of preparing hexachlorophenol, the steps which consist in intermixing chlorine with phenol at a temperature between 70° and 80° C. in an ethylene chloride solution in the presence of antimony pentachloride in the amount of 5 per cent by weight of the amount of phenol, evaporating a portion of the ethylene chloride from the reaction mixture, returning the evaporated solvent to the first step, crystallizing hexachlorophenol from the residual solution, separating the crystals from the mother liquor, and returning the mother liquor to the first step.

EDGAR C. BRITTON.
LAWRENCE F. MARTIN.
FRANCIS NELSON ALQUIST.
ROY LYMAN HEINDEL, Jr.